(12) United States Patent
Prakah-Asante

(10) Patent No.: US 10,155,523 B2
(45) Date of Patent: Dec. 18, 2018

(54) ADAPTIVE OCCUPANCY CONVERSATIONAL AWARENESS SYSTEM

(71) Applicant: Ford Global Technologies, LLC, Dearborn, MI (US)

(72) Inventor: Kwaku O. Prakah-Asante, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/473,976

(22) Filed: Mar. 30, 2017

(65) Prior Publication Data

US 2018/0281806 A1    Oct. 4, 2018

(51) Int. Cl.
*B60W 40/08*    (2012.01)

(52) U.S. Cl.
CPC ......... *B60W 40/08* (2013.01); *B60W 2420/54* (2013.01); *B60W 2710/30* (2013.01)

(58) Field of Classification Search
CPC ............. B60W 40/08; B60W 2710/30; B60W 2420/54; H04R 2499/13
See application file for complete search history.

(56) References Cited

U.S. PATENT DOCUMENTS

| | | | |
|---|---|---|---|
| 5,694,116 A | 12/1997 | Kojima | |
| 9,229,905 B1 * | 1/2016 | Penilla | G06F 17/00 |
| 9,758,095 B2 * | 9/2017 | Briggs | B60O 9/00 |
| 9,956,963 B2 * | 5/2018 | Vijaya Kumar | B60W 40/08 |
| 2009/0198413 A1 | 8/2009 | Miller et al. | |
| 2011/0137520 A1 * | 6/2011 | Rector | H04M 1/72577 701/36 |
| 2013/0038437 A1 | 2/2013 | Talati et al. | |
| 2014/0282931 A1 * | 9/2014 | Protopapas | G06F 21/31 726/5 |
| 2015/0125126 A1 | 5/2015 | Dreuw | |
| 2016/0001781 A1 * | 1/2016 | Fung | G06F 19/345 701/36 |
| 2017/0061965 A1 * | 3/2017 | Penilla | H04L 67/12 |

FOREIGN PATENT DOCUMENTS

| | | | |
|---|---|---|---|
| GB | 2504586 A | | 5/2014 |
| JP | 2008-204056 | * | 9/2008 |
| JP | 2016207001 A | | 12/2016 |

* cited by examiner

*Primary Examiner* — Michael J Zanelli
(74) *Attorney, Agent, or Firm* — Frank A. MacKenzie; MacMillan, Sobanski & Todd, LLC

(57) ABSTRACT

A dynamic conversational awareness system including at least one microphone capturing sound data within an interior passenger compartment of a vehicle. An interior conversational threshold analyzer (ICTA) analyzes sound data within a predetermined frequency range. The ICTA determines whether the sound data within the predetermined frequency range exceeds a threshold. A sensitivity decision targeting unit (SDT) reconfigures vehicle settings associated with a user profile when the sound data exceeds the threshold. The respective reconfigured vehicle setting is utilized to enable a driver alertness operation of a vehicle system in response to actuation of the vehicle system.

20 Claims, 3 Drawing Sheets

ADAPTIVE OCCUPANCY CONVERSATIONAL AWARENESS SYSTEM

CROSS REFERENCE TO RELATED APPLICATIONS

Not Applicable.

STATEMENT REGARDING FEDERALLY SPONSORED RESEARCH

Not Applicable.

BACKGROUND OF INVENTION

The present invention relates generally to dynamic driver awareness systems.

When a young driver, elderly driver, or novice driver is driving a vehicle, the driver must pay particular attention and not to lose focus on the task of driving and other external conditions while driving the vehicle. Various events, such as loud music as well as occupants within the vehicle may contribute to the distractions of the driver. For example, loud or high-spirited conversations can result in the loss of concentration not only on the task of driving, but may prevent the driver from reacting quickly to vehicle alerts output by the vehicle, and more so, when engaged in maneuvers which may require increased attention and quick reaction by the driver. Primarily, for drivers where attention may be an issue or may be easily distracted, it is well known that the presence of other occupants, such as teens where high-spirited conversations are likely, may be detrimental to the driver's focus and awareness. As high-spirited conversations continue, it is important for a driver not to be distracted by these conversations and regain focus on the driving event. There are known techniques to assist a driver in regaining focus and attention on the road of travel, but such systems often treat all drivers the same and may apply the same techniques.

SUMMARY OF INVENTION

An advantage of the embodiments described herein is an interior conversational threshold analyzer (ICTA) system for analyzing a specific frequency range relating to conversational sounds within the vehicle. The ICTA analyzes respective sound data of the conversational sounds that are within a predetermined frequency band to determine whether the analyzed sound data exceeds a predetermined threshold for determining that the driver may be engaged in conversations that may distract the driver's concentration on the task of driving. The system and techniques described herein allows a responsible person, preferably other than the driver, to set up a user profile for the driver within the ICTA so that typical vehicle subsystem settings may be customized to that driver to assist in maintaining the driver's focus on the task of driving. In addition to analyzing sound data from a respective frequency range, background noise is removed from the captured sound data as well. If the analyzed sound data exceeds a predetermined threshold, then a flag is set and a sensitivity decision targeting unit utilizes the user profile to personalize vehicle sensitivity settings for the driver. As a result, the time at which warning message is provided to the driver may be modified as well as delaying connectivity of certain devices such as phones and other messaging devices. Various devices such as an HMI, facial recognition, or fob device communicating a signal to the vehicle may be used to identify the driver of the vehicle so that the user profile associated with the driver is enabled for the driving event.

An embodiment contemplates a dynamic conversational awareness system that includes at least one microphone capturing sound data within an interior passenger compartment of a vehicle. An interior conversational threshold analyzer (ICTA) analyzes sound data within a predetermined frequency range. The ICTA determines whether the sound data within the predetermined frequency range exceeds a threshold. A sensitivity decision targeting unit (SDT) reconfigures vehicle settings associated with a user profile when the sound data exceeds the threshold. The respective reconfigured vehicle setting is utilized to enable a driver alertness operation of a vehicle system in response to actuation of the vehicle system.

An embodiment contemplates a system that includes a microphone capturing sound data within a vehicle passenger compartment. A threshold analyzer analyzes sound data within a predetermined frequency range to determine whether the sound data exceeds a threshold. A sensitivity decision targeting unit reconfigures vehicle settings associated with a user profile when the sound data exceeds the threshold. A reconfigured vehicle setting enables a driver alertness operation of a vehicle system in response to actuation of the vehicle system.

DETAILED DESCRIPTION

Figure 1:
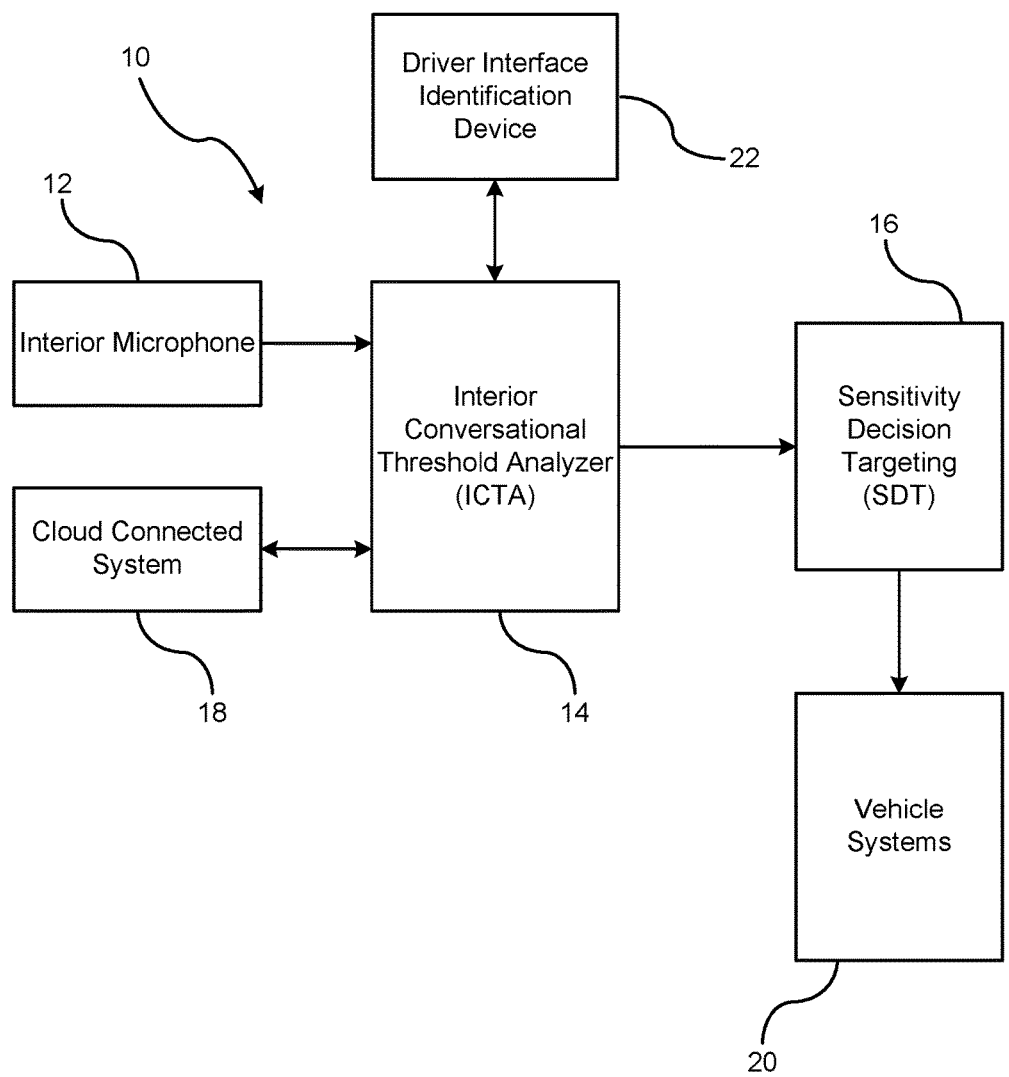
FIG. 1 is a block diagram for an adaptive occupancy conversational awareness system.

There is shown in FIG. 1 a block diagram for an adaptive occupancy conversational awareness system 10. The adaptive occupancy conversational awareness system 10 includes at least one interior microphone 12, an interior conversational threshold analyzer (ICTA) system 14, a sensitivity decision targeting (SDT) system 16, a data storage system 18, that are adaptively used to modify vehicle driver assistance systems 20 to assist the driver to maintain focus on the road of travel.

The interior microphone 12 is disposed within an interior passenger compartment of a vehicle for capturing conversational sounds therein. The interior microphone 12 captures sound data within the interior passenger compartment and the sound data is transferred to the ICTA 14. Alternatively, the data storage system 18 may include an on-board storage device or a remote cloud system wirelessly connected to the vehicle.

The ICTA 14 includes a processor that determines whether a driver and other occupants are engaged in loud-spirited conversations. The ICTA 14 computes conversation sound energy levels which are specific characteristic noise levels within the interior passenger compartment of a vehicle based on the captured sound data and determines when the sound levels exceed a respective threshold such that conditions are flagged for adaptively modifying vehicle driver assistance systems 20 to assist the driver to maintain focus on the road of travel. The ICTA 14 obtains the captured sound from interior microphone 12 and concentrates its analysis on a respective frequency band that includes those sound characteristics within a respective frequency range that is associated with the expected communications of drivers and other occupants within the vehicle. The ICTA 14 further includes a broadband filter for filtering out background noises to isolate the background sound from the conversational sound of the vehicle occupants. Background noises that are filtered out may include, but are not limited to, ambient interior noises other than occupant voices such as vehicle generated sounds, outside environmental sounds, and multimedia sound.

The adaptive occupancy conversational awareness system 10 may further include a driver identification device 22 for identifying the driver so that an associated user profile stored in a memory may be accessed for use by the ICTA 14 and the SDT 16. The driver interface identification device 22 may include, but is not limited to, a human machine interface (HMI), a fob, occupant or facial recognition device, or a biometric sensing device. Moreover, one or more of the driver identification devices as described may be used cooperatively to identify the driver.

Figure 2:
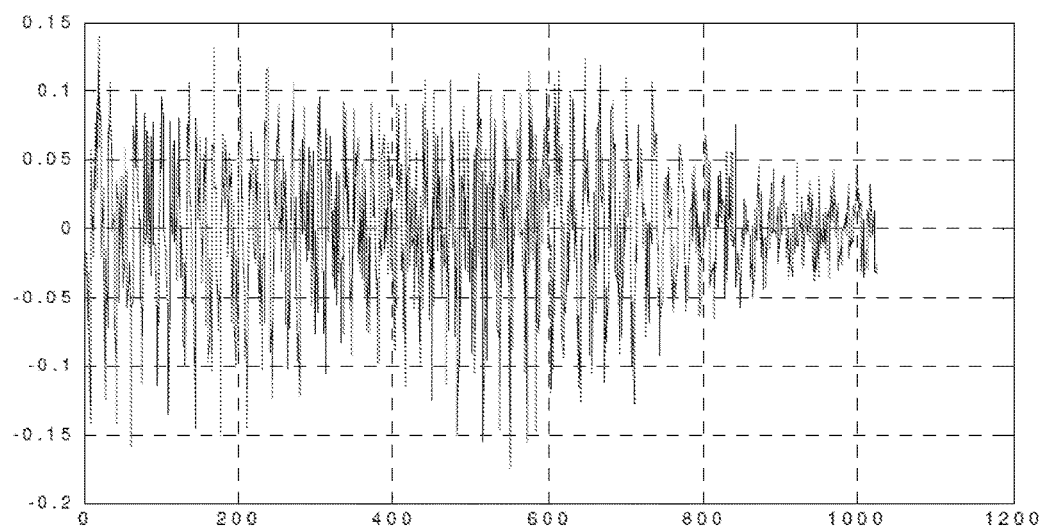
FIG. 2 illustrates an exemplary plot of a discrete time microphone voltage output.
Figure 3:
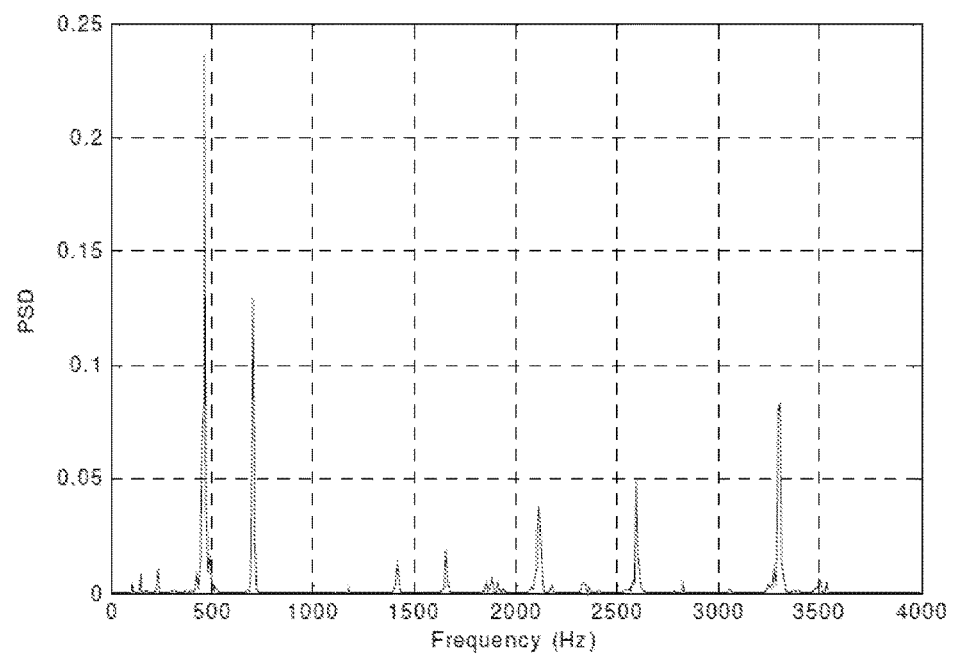
FIG. 3 illustrates an exemplary plot of sound energy distribution plot.

FIG. 2 illustrates an exemplary plot of a discrete time voltage output by the interior microphone 12. The y-axis represents voltage and the x-axis represents the number of samples for a time period. The ICTA 14 determines an energy distribution as shown in FIG. 3 based on the time voltage plot in FIG. 2. The y-axis represents the power spectral density (PSD) and the x-axis represents the frequency. The ICTA 14 based on the PSD plot performs an aggregation of the output at related frequencies over a period of time for determining whether the driver and occupants are engaged in loud high-spirited conversations which may result in a lack of concentration of the driver on the task of driving.

The ICTA 14 sets an ICTA_flag that is represented by the following expression:

$$ICTA_{flag(k)} = \begin{Bmatrix} 1 & \text{if } ICTA(k) > ICTA_T \\ 0 & \text{otherwise} \end{Bmatrix}$$

where ICTA(k) is the accumulated energy at an instant, $ICTA_T$ represents an ICTA threshold value.

The flag is communicated to the SDT system 16 if the energy is greater than a predetermined threshold. The SDT 16 is a subsystem that provides individualized vehicle system settings for the driver, and more specifically, novice drivers or elderly drivers. The SDT 16 applies decision rules to determine activation of a relevant alert reminder and/or subsystem modification. Reminders may include visual alerts, audible alerts, or haptic alerts. Subsystem modifications may include, but are not limited to, delaying connectivity communication to the driver, providing earlier collision (e.g., collision warning system) and lane departure warnings times (e.g., lane departure warning system). The SDT 16 personalizes vehicle sensitivity settings for the driver based on a predetermined profile. That is, each selected driver, particularly novice drivers such as those with minimal driving experience, may have a user profile set up in the SDT 16. The user profile may be set by a responsible person (e.g., parent) that customizes individual settings for modifying a warning relating to a driver alertness operation and other sensitivity settings of a vehicle subsystem when the system detects that conversation noises within the interior passenger compartment have exceeded a respective threshold which is an indication that the driver is not applying full attention to the driving task. When the ICTA 14 has flagged a condition that the communication noise threshold is exceeded, the SDT 16 looks up the profile for the driver and determines which vehicle subsystem settings require modification to either trigger a warning earlier or delay a subsystem actuation in comparison to a factory setting. For example, if a forward collision warning requires actuation, the SDT 16 may direct the appropriate subsystem to increase the warning time by providing an earlier notification to the driver collision and lane departure warning than what is typically configured. The responsible person configuring the user profile may want a warning triggered earlier based on the distance between the vehicle and a sensed objet or based on time to collision to give the driver more time to react. Other configurations may include delaying input connectivity that includes, but is not limited to, delaying connectivity of incoming phone calls/messages or lowering the volume of the multimedia device currently outputting audio.

The SDT 16 applies the decision rules to determine the activation of the relevant alert reminder. An example of a general rule may be in the following form:

If($ICTA_{flag}$ is $x_i$ and driver type is $z_i$)

then SDT_value=$m_i$ where,
ICTA_flag: 1—frequent interior conversation greater than tunable threshold;
0—Minimum conversations
Driver Type: 1—Novice, elderly; 0—average
SDT_value: $m_i$=(1, 2, or 0).
where,
1: Delay input connectivity information;
2: Earlier alerts for assist systems; and
0: no action.

Figure 4:
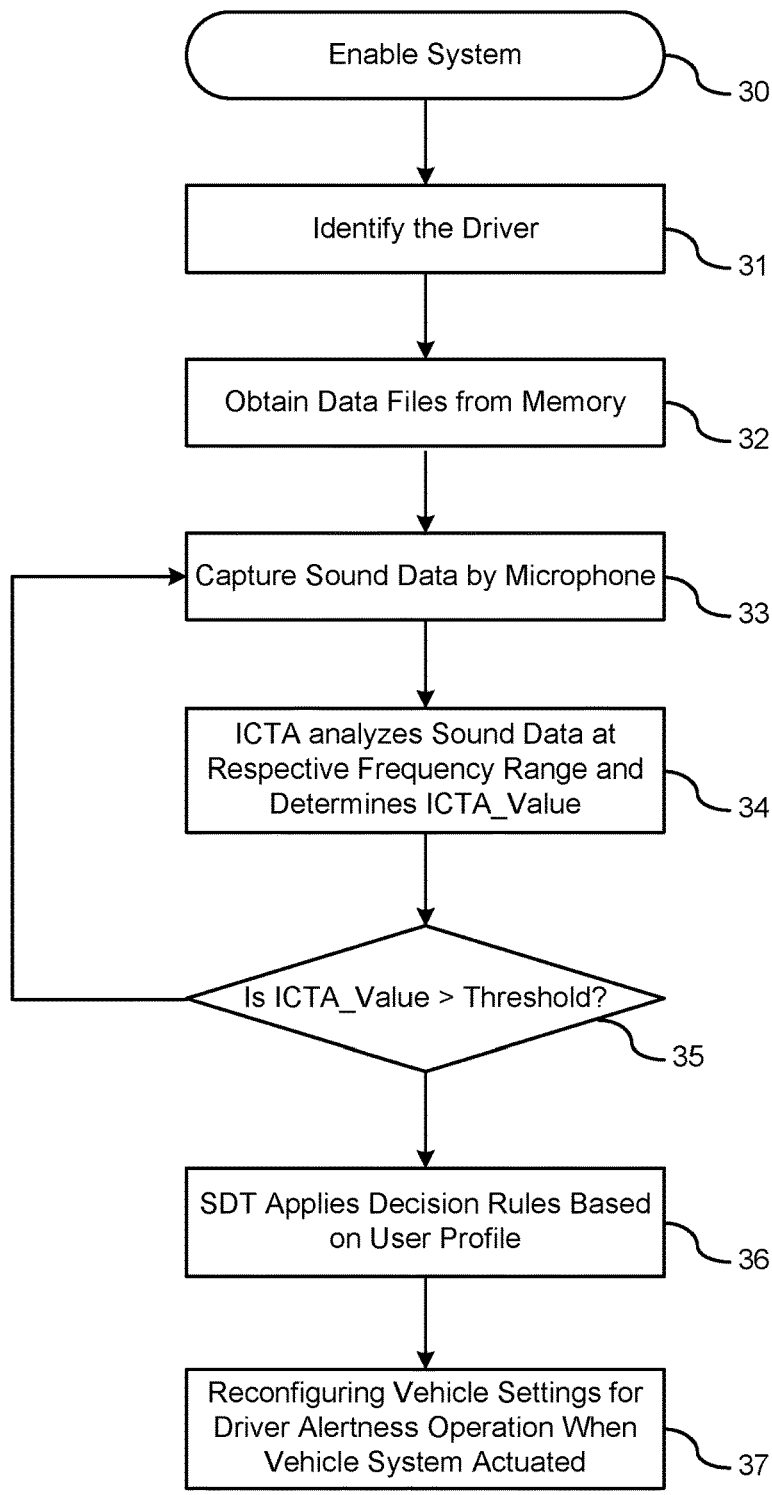
FIG. 4 illustrates a flowchart for a method of the operational flow of the conversational awareness system.

FIG. 4 illustrates a flowchart for a method of the operational flow of the conversational awareness system. In block 30, the technique is enabled for monitoring conditions within the interior passenger compartment of the vehicle.

In block 31, the driver is identified by either the driver inputting its identification information or a vehicle system identifying the driver through various techniques including, but not limited to, occupant detection, RFID tags, biometric sensing, facial recognition, MyKey, or keyfobs.

In block 32, vehicle interior sound information, connectivity data, vehicle and driver information is obtained from either a vehicle memory storage or other memory storage such as a cloud.

In block 33, one or more interior microphones capture sound data within the interior passenger compartment of the vehicle.

In block 34, the ICTA analyzes the captured sound data at the respective frequency range relating to occupant voices within the interior passenger compartment and also filters background noises from the sound data. The ICTA computes conversational sound energy levels and determines associated decision-making flags (ICTA_value) for the SDT.

In block 35, a determination is made whether the ICTA_value is greater than a threshold. If the determination is made that the ICTA_value is not greater than the threshold, then the routine returns to block 33 to monitor sound data within the interior passenger compartment. If the determination is made that the ICTA_value is greater than the threshold, then the routine proceeds to block 36.

In block 36, the SDT applies the decision rules that are personalized for the identified driver and determines activation settings associated with the driver based on the driver's profile. Respective activation settings associated with the driver are dynamically modified from their typical settings based on the driver's profile.

In block 37, vehicle systems and connectivity settings are adjusted in real-time and actuated accordingly should a respective vehicle system or connectivity become actuated and the driver alertness operation require actuation for the respective vehicle system.

While certain embodiments of the present invention have been described in detail, those familiar with the art to which this invention relates will recognize various alternative designs and embodiments for practicing the invention as defined by the following claims.

What is claimed is:

1. A dynamic conversational awareness system comprising:
    at least one microphone capturing sound data within an interior passenger compartment of a vehicle;
    an interior conversational threshold analyzer (ICTA) analyzing sound data within a predetermined frequency range, the ICTA determining whether the sound data within the predetermined frequency range exceeds a threshold;
    a sensitivity decision targeting (SDT) system reconfiguring vehicle settings associated with a user profile when the sound data exceeds the threshold;
    wherein the respective reconfigured vehicle setting is utilized to enable a driver alertness operation of a vehicle system in response to actuation of the vehicle system.

2. The dynamic conversational awareness system of claim 1 wherein the predetermined frequency range analyzed by the ICTA relates to conversational sounds spoken by occupants within the interior passenger compartment of the vehicle.

3. The dynamic conversational awareness system of claim 2 wherein the ICTA includes a broadband filter to filter background noises from the sound data.

4. The dynamic conversational awareness system of claim 3 wherein the background noises include multimedia sound data.

5. The dynamic conversational awareness system of claim 3 wherein the background noises include environmental sound data.

6. The dynamic conversational awareness system of claim 1 wherein the user profile is stored in a memory of the ICTA.

7. The dynamic conversational awareness system of claim 1 further comprising a remote data storage system, wherein the user profile is stored in the remote data storage system.

8. The dynamic conversational awareness system of claim 1 wherein the user profile includes configurable decision rules for modifying vehicle settings.

9. The dynamic conversational awareness system of claim 8 wherein each user profile is associated with a respective user, wherein each user profile includes a set of customized decision rules personalized for a respective user.

10. The dynamic conversational awareness system of claim 8 wherein the SDT unit accesses the user profile of an identified driver and applies the decision rules within the user profile for adaptively modifying the vehicles settings.

11. The dynamic conversational awareness system of claim 8 wherein the vehicle system includes a collision warning system, and wherein the decision rules within the user profile for adaptively modifying the vehicle setting includes actuating an earlier collision warning in comparison to a factory configured setting.

12. The dynamic conversational awareness system of claim 8 wherein the vehicle system includes a lane departure warning system, and wherein the decision rules within the user profile for adaptively modifying the vehicle setting includes actuating an earlier lane departure warning in comparison to a factory configured setting.

13. The dynamic conversational awareness system of claim 8 wherein the vehicle system includes a connectivity setting, and wherein the decision rules within the user profile for adaptively modifying the connectivity setting includes delaying connectivity of incoming phone calls.

14. The dynamic conversational awareness system of claim 8 wherein the vehicle system includes a connectivity setting, and wherein the decision rules within the user profile for adaptively modifying the connectivity setting includes delaying connectivity of incoming messages.

15. The dynamic conversational awareness system of claim 8 wherein the vehicle system includes a connectivity setting, and wherein the decision rules within the user profile for adaptively modifying the setting includes lowering a volume setting of a vehicle multimedia device.

16. The dynamic conversational awareness system of claim 1 further including a driver identification device for identifying a driver of the vehicle.

17. The dynamic conversational awareness system of claim 16 wherein the driver identification device includes a human machine interface device where a user manually selects the driver identification.

18. The dynamic conversational awareness system of claim 16 wherein the driver identification device includes a fob device where the fob device transmits a signal to the vehicle identifying the user.

19. The dynamic conversational awareness system of claim 16 wherein the driver identification device includes a facial recognition device for identifying the driver.

20. A system comprising:
    a microphone capturing sound data within a vehicle passenger compartment;
    a threshold analyzer analyzing sound data within a predetermined frequency range to determine whether the sound data exceeds a threshold;
    a sensitivity decision targeting unit reconfiguring vehicle settings associated with a user profile when the sound data exceeds the threshold, wherein a reconfigured vehicle setting enables a driver alertness operation of a vehicle system in response to actuation of the vehicle system.

* * * * *